US012169063B2

(12) United States Patent
Li

(10) Patent No.: US 12,169,063 B2
(45) Date of Patent: Dec. 17, 2024

(54) STRAWBERRY LAMP HOLDER STRUCTURE THAT CAN BE AUTOMATICALLY PRODUCED

(71) Applicant: Ming Li, Guangdong (CN)

(72) Inventor: Ming Li, Guangdong (CN)

(73) Assignee: Shenzhen HYSIRY Technology Co., Ltd, Shenzhen (CN)

( * ) Notice: Subject to any disclaimer, the term of this patent is extended or adjusted under 35 U.S.C. 154(b) by 126 days.

(21) Appl. No.: 17/947,088

(22) Filed: Sep. 17, 2022

(65) Prior Publication Data

US 2024/0084994 A1 Mar. 14, 2024

(30) Foreign Application Priority Data

Sep. 8, 2022 (CN) ........................ 202211099985.9

(51) Int. Cl.

| | |
|---|---|
| ***F21V 3/02*** | (2006.01) |
| ***F21S 4/10*** | (2016.01) |
| ***F21V 17/12*** | (2006.01) |
| ***F21V 21/088*** | (2006.01) |
| ***F21V 23/00*** | (2015.01) |

(52) U.S. Cl.

CPC ................ *F21V 3/02* (2013.01); *F21V 17/12* (2013.01); *F21V 21/088* (2013.01); *F21S 4/10* (2016.01); *F21V 23/001* (2013.01)

(58) Field of Classification Search

CPC ................................ F21S 4/10; F21V 23/001

See application file for complete search history.

(56) References Cited

U.S. PATENT DOCUMENTS

| | | | | | |
|---|---|---|---|---|---|
| 4,631,650 | A * | 12/1986 | Ahroni | F21S 4/10 | 174/114 R |
| 5,649,763 | A * | 7/1997 | Liou | F21S 4/10 | 362/363 |
| 5,722,853 | A * | 3/1998 | Hwang | F21V 21/002 | 439/340 |
| 6,056,422 | A * | 5/2000 | Huang | F21S 4/10 | 362/396 |
| 6,116,944 | A * | 9/2000 | Tseng | H01R 4/2406 | 439/419 |
| 6,176,600 | B1 * | 1/2001 | Huang | F21S 4/10 | 362/396 |
| 2007/0218753 | A1 * | 9/2007 | Tsai | H01R 25/003 | 439/419 |
| 2010/0290240 | A1 * | 11/2010 | Genenbacher | F21V 21/096 | 362/398 |
| 2011/0050081 | A1 * | 3/2011 | Lin | F21V 21/002 | 313/318.01 |

* cited by examiner

*Primary Examiner* — Peggy A Neils
*Assistant Examiner* — James M Endo

(57) ABSTRACT

A strawberry lamp holder structure that can be automatically produced, wherein the strawberry lamp holder structure includes a bulb casing, a lamp holder, and a lamp holder cover; the lamp holder cover is inserted into the lamp holder; the direction in which the lamp holder cover is inserted into the lamp holder is denoted as a first direction, and the direction perpendicular to the first direction is denoted as a second direction; viewed from the second direction, the lamp holder cover is recessed inwardly to form first clamping parts, and the lamp holder is recessed inwardly to form second clamping parts located on the same side as the first clamping parts; a first gap is formed between the first clamping part and the second clamping part. The installation action is simpler and the automatic production is more convenient.

4 Claims, 15 Drawing Sheets

STRAWBERRY LAMP HOLDER STRUCTURE THAT CAN BE AUTOMATICALLY PRODUCED

1. Technical Field

The invention relates to the technical field of light strings, in particular to a strawberry lamp holder structure that can be automatically produced.

2. Background Art

At present, the lighting industry is developing vigorously with the large-scale use of LEDs, and the production scale of enterprises is also increasing, but the production process is still in a manual or semi-automatic state. At present, the assembly of lamp bead and wires generally adopts an automatic welding process, but the subsequent assembly of lamp bead and lamp holders is still done manually, which not only has low work efficiency, but also makes it difficult to ensure the assembly quality of the product. The structure of the lamp holder does not take account of the needs of automatic installation, which leads to complicated installation actions, and is one of the reasons affecting automatic production. Therefore, it is necessary to provide a strawberry lamp holder structure that can be automatically produced, which avoids complicated installation actions and is more convenient for automated production.

3. Summary of the Invention

The purpose of the invention is to provide a strawberry lamp holder structure that can be automatically produced, which avoids complicated installation actions and is more convenient for automated production.

One aspect of the invention is to provide a strawberry lamp holder structure that can be automatically produced, wherein the strawberry lamp holder structure comprises:

a bulb casing;

a lamp holder, which is connected to the bulb casing;

a lamp holder cover, which is inserted into the lamp holder; the direction in which the lamp holder cover is inserted into the lamp holder is denoted as a first direction, and the direction perpendicular to the first direction is denoted as a second direction; viewed from the second direction, the lamp holder cover is recessed inwardly to form first clamping parts, and the lamp holder is recessed inwardly to form second clamping parts located on the same side as the first clamping parts; a first gap is formed between the first clamping part and the second clamping part;

a lamp bead, with wires in series at both ends; the lamp bead is provided between the lamp holder and the lamp holder cover, and the wire extends out of the strawberry lamp holder structure through the first gap.

Preferably, the direction perpendicular to the first direction and the second direction is denoted as a third direction;

viewed from the second direction, the lamp holder cover extends outwardly along the third direction to form reverse limiting blocks, and the lamp holder extends inwardly along the third direction to form reverse limiting steps matched with the reverse limiting blocks; when the lamp holder cover is inserted into the lamp holder along the first direction, the reverse limiting blocks and the reverse limiting steps are abutted along the first direction.

Preferably, the lamp holder cover comprises:

a cover plate; the first clamping parts are symmetrically arranged on both sides of the cover plate, and the first clamping parts extend inwardly from the outer peripheral edge of the cover plate to form a plane;

a hanger, which is integrally foil led with the cover plate;

the lamp holder comprises:

an upper casing; the second clamping parts are symmetrically arranged on the upper casing, and the second clamping parts extend inwardly from the outer peripheral edge of the upper casing to form a plane, and the plane formed by the first clamping part is coplanar with the plane formed by the second clamping part, a lower casing, which is integrally formed with the upper casing; the lower casing is formed with an internal thread, and the lower casing is in threaded connection with the bulb casing through the internal thread;

the bulb casing comprise:

a strawberry casing;

a threaded connection part, which is integrally formed at the end of the strawberry casing part close to the lamp holder, and the threaded connection part is formed with an external thread; the external thread is matched with the internal thread of the lower casing to connect the lower casing and the bulb casing.

Preferably, the lamp holder cover further comprises:

a first supporting plate, which is formed by extending from the cover plate toward the direction close to the lamp holder;

a second supporting plate, which is arranged opposite to the first supporting plate, and a second gap is formed between the first supporting plate and the second supporting plate; the first gap is communicated with the second gap;

an installation part, which is integrally formed between the first supporting plate and the second supporting plate; the lamp bead is provided on the side of the installation part close to the lamp holder; when the lamp holder cover is inserted into the lamp holder, the space on the side of the installation part close to the lamp holder is kept in communication with the second gap; the wire extends out of the strawberry lamp holder structure through the second gap and the first gap.

Preferably, the reverse limiting blocks are respectively arranged on the side of the first supporting plate away from the second supporting plate, and on the side of the second supporting plate away from the first supporting plate;

the upper casing comprises:

first guiding parts, which are formed by extending from the upper casing;

second guiding parts, which are arranged opposite to the first guiding parts; a third gap is formed between the first guiding part and the second guiding part; the first supporting plate and the second supporting plate are inserted into the third gap along the first direction.

Preferably, the middle of the first guiding part is recessed outwardly to form a first guiding groove, and the middle of the second guiding part is recessed outwardly to form a second guiding groove; the reverse limiting steps are respectively arranged in the first guiding groove and the second guiding groove.

A strawberry light string, comprising the strawberry lamp holder structure that can be automatically produced.

An automated production method for the strawberry light string, for producing the strawberry light string, wherein the method comprising the steps of:

fixing the lamp holder cover at a first position by the first clamping parts;

fixing the lamp holder at a second position by the second clamping parts, and the first position and the second position are collinear in the first direction;

arranging the wires connected with the lamp bead in series between the lamp holder cover and the lamp holder along the second direction, and each of the lamp beads is collinear with each of the lamp holders and each of the lamp holder covers in the first direction;

pushing the lamp holder cover to be inserted into the lamp holder along the first direction, and in the process of inserting, the lamp holder cover first contacts with the lamp bead, and drives the lamp bead to be squeezed into the lamp holder along the first direction; the wire extends to the outside of the lamp holder through the first gap;

connecting the bulb casing to the lamp holder.

Preferably, the distance between two adjacent lamp beads is denoted as L, the length of the wire between two adjacent lamp beads is denoted as T, and the height of the lamp holder cover is denoted as H, which satisfy the relational expression.

$$L+2H<T.$$

The invention has the following advantageous effects:

The invention decomposes the traditional assembly of lamp holder and lamp bead into the assembly of lamp holder, lamp holder cover and lamp bead, and first clamping parts and second clamping parts are respectively provided on the lamp holder cover and the lamp holder, so as to facilitate grasping or fixing by the manipulator; the lamp bead is provided between the lamp holder cover and the lamp holder, and a first gap is formed between the first clamping part of the lamp holder cover and the second clamping part of the lamp holder, so as to facilitate the passage of welded wires, therefore, the lamp holder cover and the lamp holder can be inserted directly, and the assembly of the lamp holder, the lamp holder cover and the lamp bead can be completed at the same time, so that the installation action is simpler and the automatic production is more convenient.

4. BRIEF DESCRIPTION OF ACCOMPANY DRAWINGS

In order to more clearly illustrate the embodiments of the invention or the technical solutions in the prior art, the drawings that need to be used in the description of the embodiments or the prior art will be briefly introduced hereinafter. Obviously, the drawings in skill in the art, other drawings can also be obtained from these drawings without creative effort.

Figure 1:
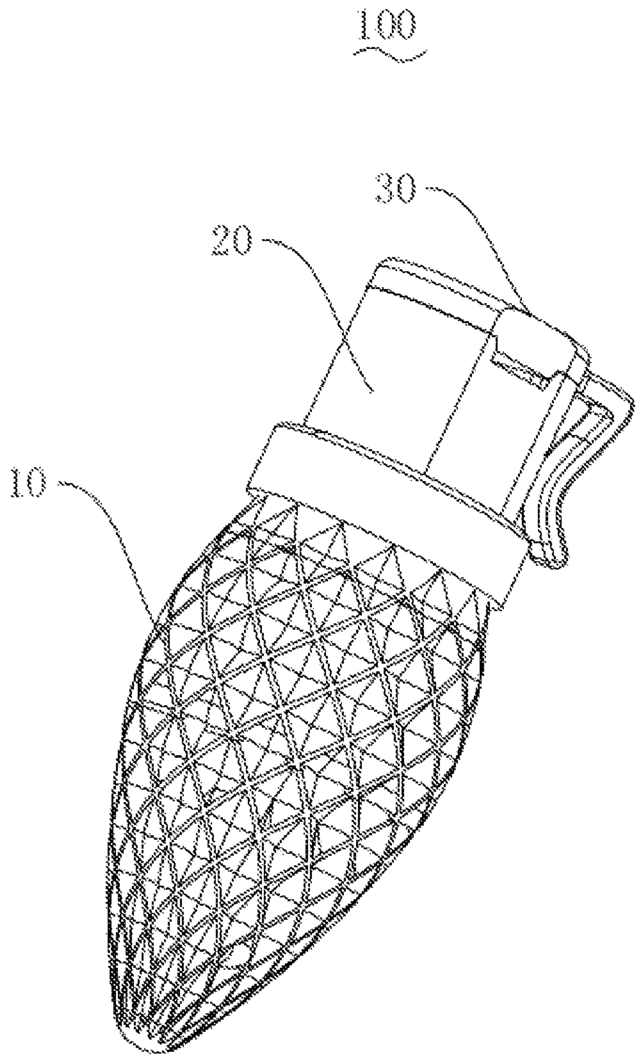
FIG. 1 is a schematic three-dimensional structural diagram of the strawberry lamp holder structure according to an embodiment of the invention.
Figure 2:
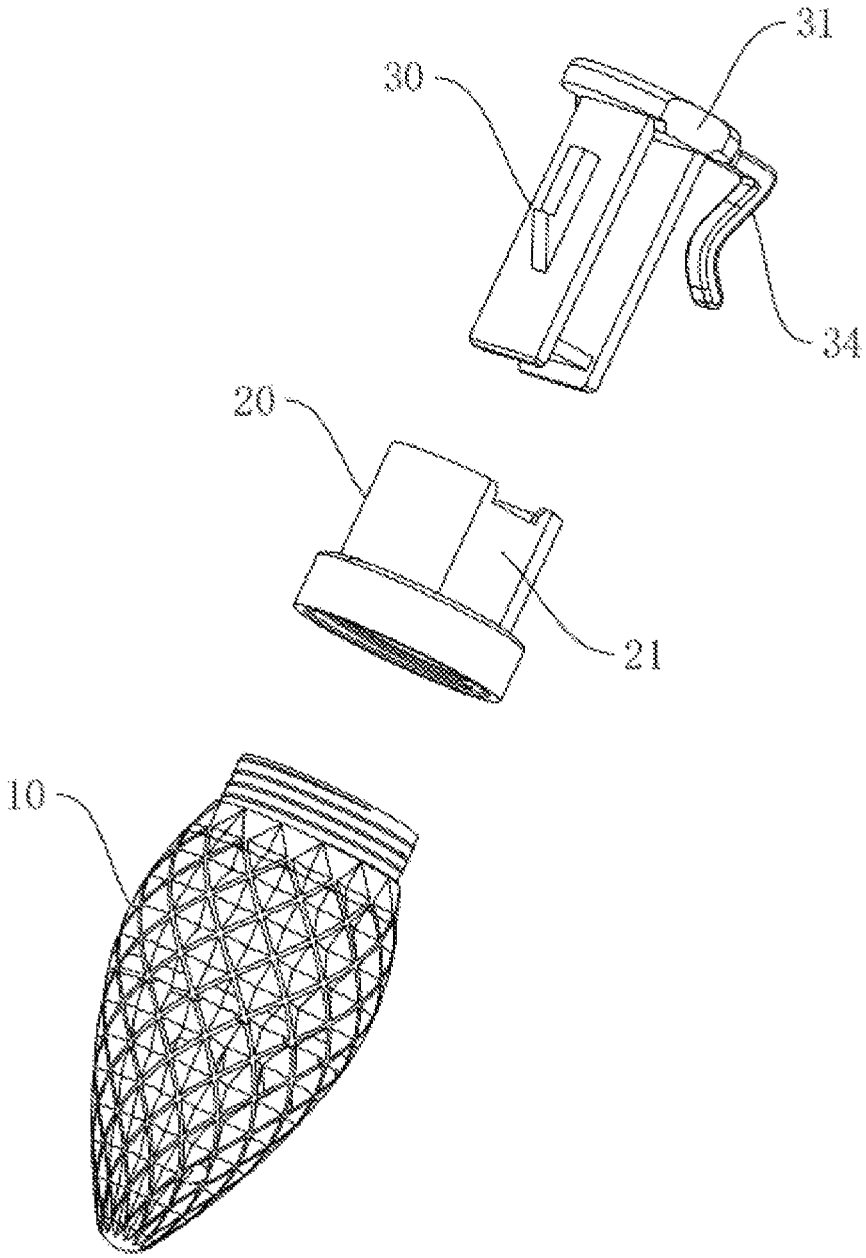
FIG. 2 is a schematic diagram of an exploded decomposition structure of the strawberry lamp holder structure according to an embodiment of the invention.

Description of reference numbers: 100 refers to the strawberry lamp holder structure; 10 refers to the bulb casing; 20 refers to the lamp holder; 30 refers to the lamp holder cover; F1 refers to the first direction; F2 refers to the second direction; 31 refers to the first clamping part; 21 refers to the second clamping part; 61 refers to the first gap; 40 refers to the lamp bead; 50 refers to the wire; F3 refers to the third direction; 32 refers to the reverse limiting block; 22 refers to the reverse limiting step; 33 refers to the cover plate; 34 refers to the hanger; 23 refers to the upper casing; 24 refers to the lower casing; 25 refers to the internal thread; 11 refers to the strawberry casing; 12 refers to the threaded connection part; 121 refers to the external thread; 35 refers to the first supporting plate; 36 refers to the second supporting plate; 62 refers to the second gap; 37 refers to the installation part; 231 refers to the first guiding part; 232 refers to the second guiding part; 63 refers to the third gap; 2311 refers to the first guiding groove; 2321 refers to the second guiding groove; D1 refers to the first position; D2 refers to the second position; 200 refers to the strawberry light string.

5. SPECIFIC EMBODIMENT OF THE INVENTION

In order to facilitate understanding of the invention, the invention will be described more fully hereinafter with reference to the drawings. The preferred embodiments of the invention are shown in the drawings. However, the invention may be embodied in many different forms and is not limited to the embodiments described herein. Rather, these embodiments are provided so that a thorough and complete understanding of the disclosure is provided.

It should be noted that when an element is referred to as being "fixed to" another element, it can be directly on the other element or intervening elements may also be present. When an element is referred to as being "connected" to another element, it can be directly connected to the other element or intervening elements may also be present. The terms "vertical", "horizontal", "left", "right", and similar expressions are used herein for illustrative purposes only.

Unless otherwise defined, all technical and scientific terms used herein have the same meaning as commonly understood by those of ordinary skill in the art to which this invention belongs. The terms used herein in the description of the invention are for the purpose of describing specific embodiments only, and are not intended to limit the invention. As used herein, the term "and/or" includes any and all combinations of one or more of the associated listed items.

With reference to FIG. 1-FIG. 15, one embodiment of the invention provides a strawberry lamp holder structure 100 that can be automatically produced, wherein the strawberry lamp holder structure 100 comprises: a bulb casing 10, a lamp holder 20, a lamp holder cover 30, and a lamp bead 40.

Wherein the lamp holder 20 is connected to the bulb casing 10, and the lamp holder cover 30 is inserted into the lamp holder 20; both ends of the lamp bead 40 are connected in series with wires 50; the lamp bead 40 is provided between the lamp holder 20 and the lamp holder cover 30, and the wire 50 extends out of the strawberry lamp holder structure 100 through the first gap. The direction in which the lamp holder cover 30 is inserted into the lamp holder 20 is denoted as a first direction F1, and the direction perpendicular to the first direction F1 is denoted as a second direction F2; viewed from the second direction F2, the lamp holder cover 30 is recessed inwardly to form first clamping parts 31, and the lamp holder 20 is recessed inwardly to form second clamping parts 21 located on the same side as the first clamping parts 31. During automatic production, the manipulator can respectively fix the lamp holder cover 30 and the lamp holder 20 through the first clamping parts 31 and the second clamping parts 21, so as to facilitate the automatic assembly line operation. A first gap 61 is formed between the first clamping part 31 and the second clamping part 21; the first gap 61 enables the wire 50 to pass through, so that in the production process, the lamp bead 40 and the wire 50 can be welded first, and then the wire 50 integrated with the lamp bead 40 is used as a whole to participate in the assembly of the lamp holder 20 and the lamp holder cover 30; during assembly, the lamp bead 40 is placed between the lamp holder 20 and the lamp holder cover 30, and the lamp bead 40 is directly pushed between the lamp holder 20 and the lamp holder cover 30 through the insertion of the lamp holder 20 and the lamp holder cover 30; at the same time, the wires 50 at both ends of the lamp bead 40 extend out of the lamp holder 20 and the lamp holder cover 30 through the first gap 61; there is no need to assemble the lamp bead 40 with the lamp holder 20 and the lamp holder cover 30 first, and then manually weld the wires 50, or assemble the wire 50 with the lamp holder 20 and the lamp holder cover 30 first, and then manually install the lamp bead 40, which makes the assembly process simpler and more convenient for automated assembly line operations.

Preferably, the direction perpendicular to the first direction F1 and the second direction F2 is denoted as a third direction F3; viewed from the second direction F2, the lamp holder cover 30 extends outwardly along the third direction F3 to form reverse limiting blocks 32, and the lamp holder 20 extends inwardly along the third direction F3 to form reverse limiting steps 22 matched with the reverse limiting blocks 32; when the lamp holder cover 30 is inserted into the lamp holder 20 along the first direction F1, the reverse limiting blocks 32 and the reverse limiting steps 22 are abutted along the first direction F1.

In one embodiment, in order to further facilitate the manipulator to grasp the lamp holder cover 30 and the lamp holder 20, the lamp holder cover 30 comprises: a cover plate 33 and a hanger 34. The lamp holder 20 comprises: an upper casing 23.

The first clamping parts 31 are formed on the cover plate 33, the first clamping parts 31 extend inwardly from the outer peripheral edge of the cover plate 33 to form a plane, and the first clamping parts 31 are symmetrically arranged on both sides of the cover plate 33; during the automated production process, the manipulator grasps the lamp holder cover 30 by gripping the first clamping parts 31 on both sides of the cover plate 33.

Figure 3:
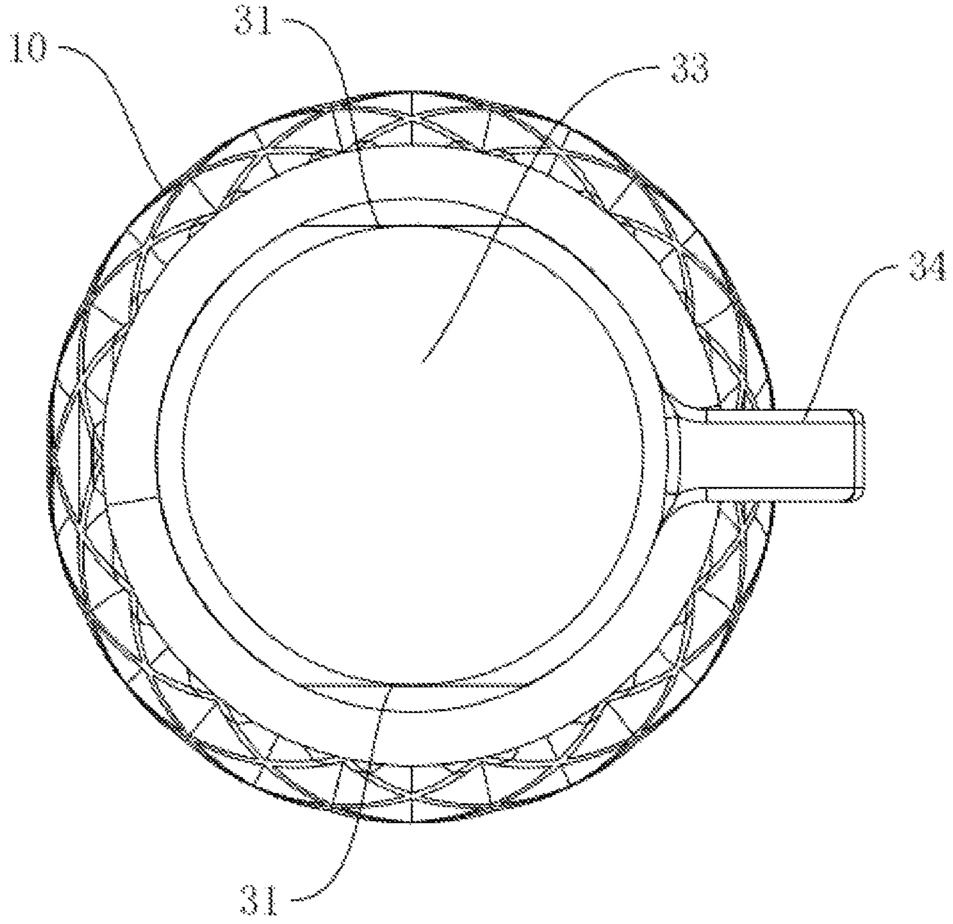
FIG. 3 is a top view of the strawberry lamp holder structure according to an embodiment of the invention.
Figure 4:
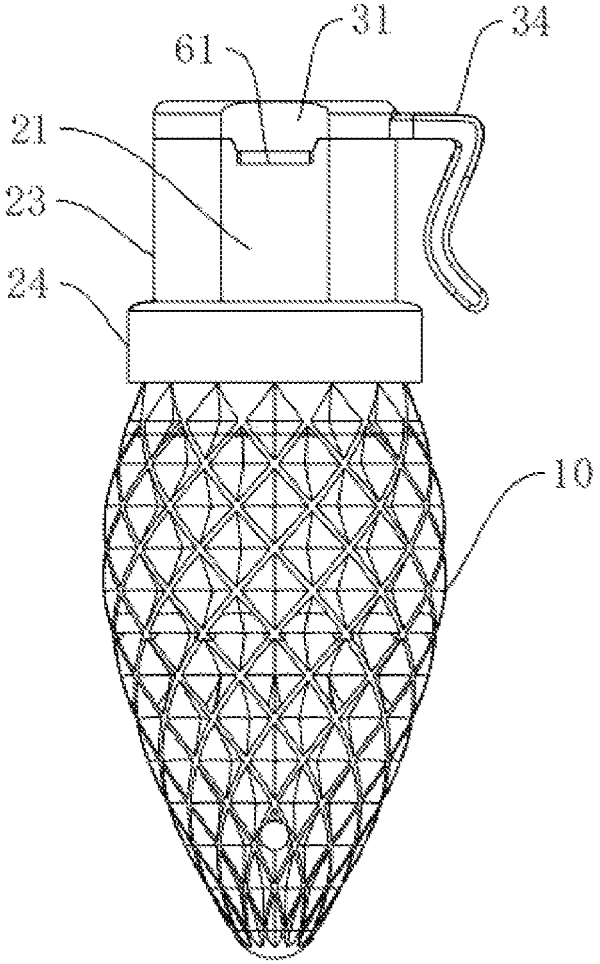
FIG. 4 is a front view of the strawberry lamp holder structure according to an embodiment of the invention.
Figure 5:
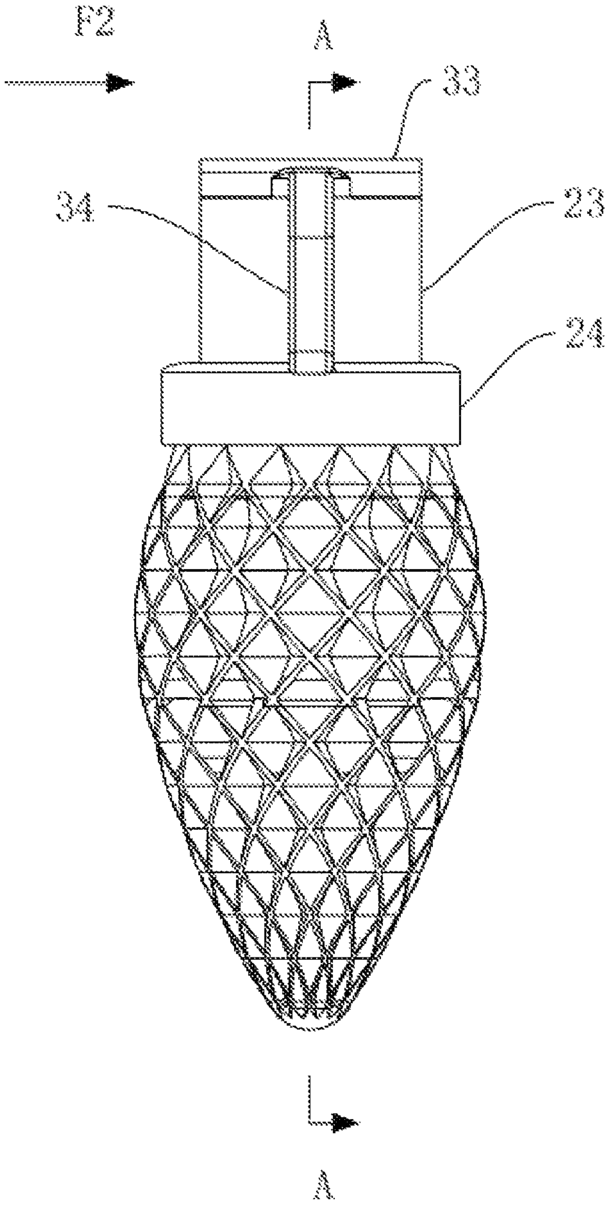
FIG. 5 is a right side view of the strawberry lamp holder structure according to an embodiment of the invention.
Figure 6:
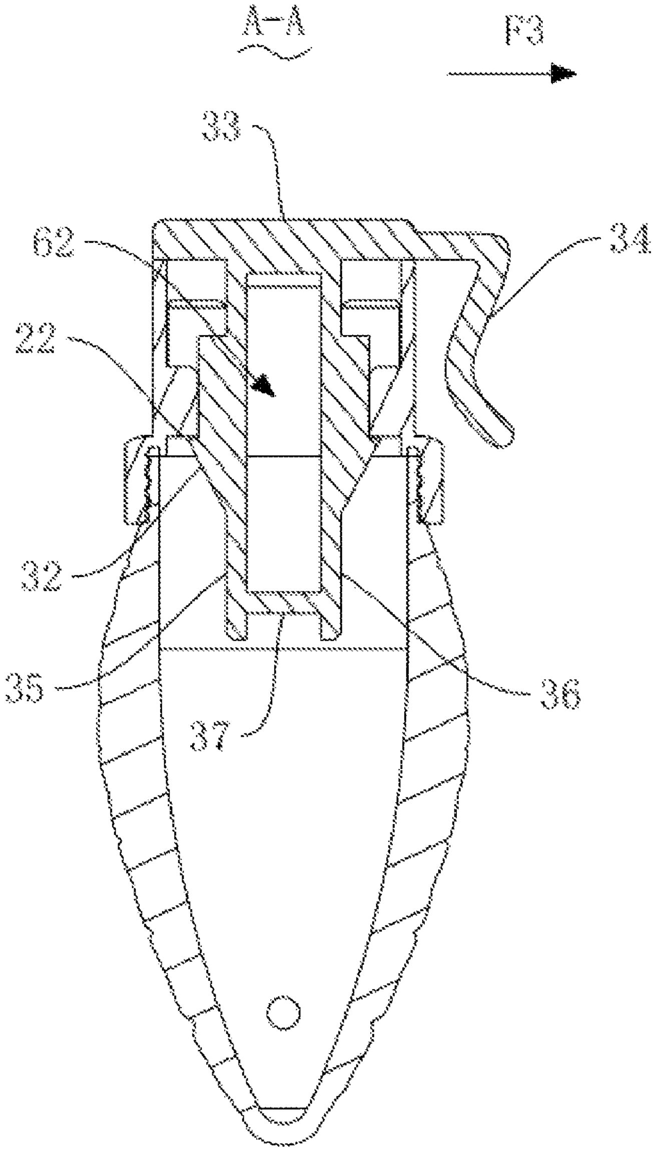
FIG. 6 is a sectional view at A-A place in FIG. 5.
Figure 7:
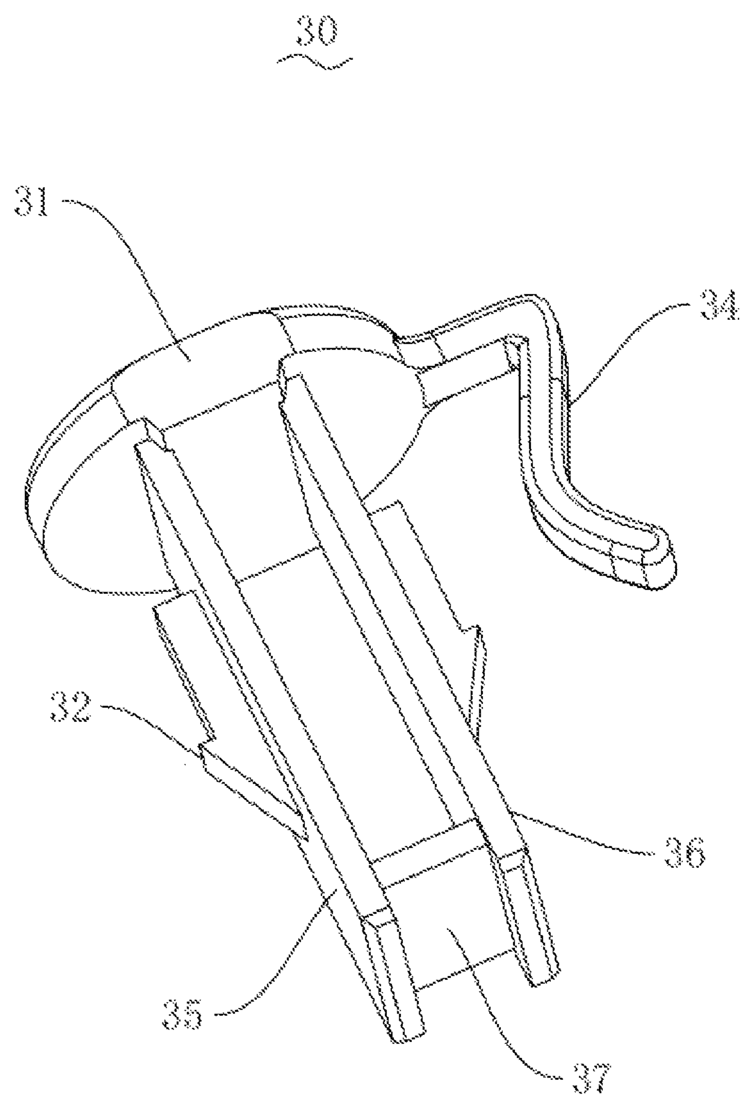
FIG. 7 is a schematic three-dimensional structure diagram of the lamp holder cover according to an embodiment of the invention.
Figure 8:
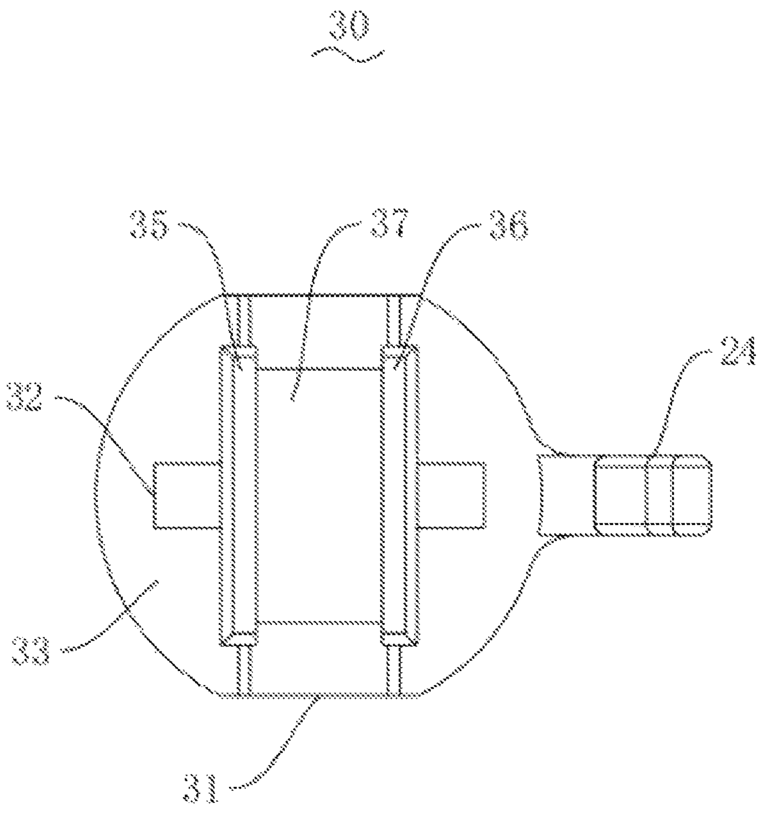
FIG. 8 is a bottom view of the lamp holder cover structure according to an embodiment of the invention.
Figure 9:
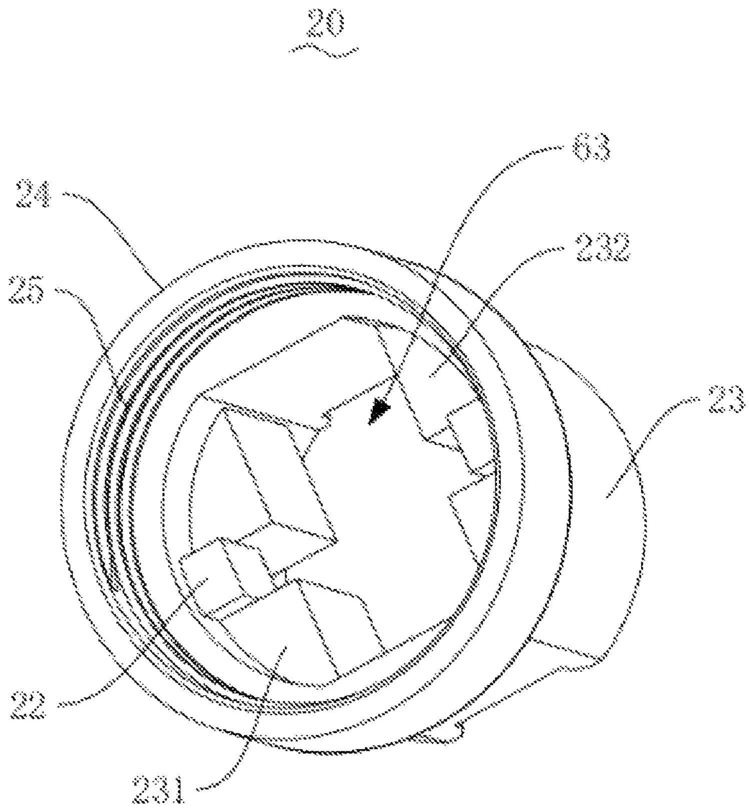
FIG. 9 is a schematic three-dimensional structure diagram of the lamp holder according to an embodiment of the invention.
Figure 10:
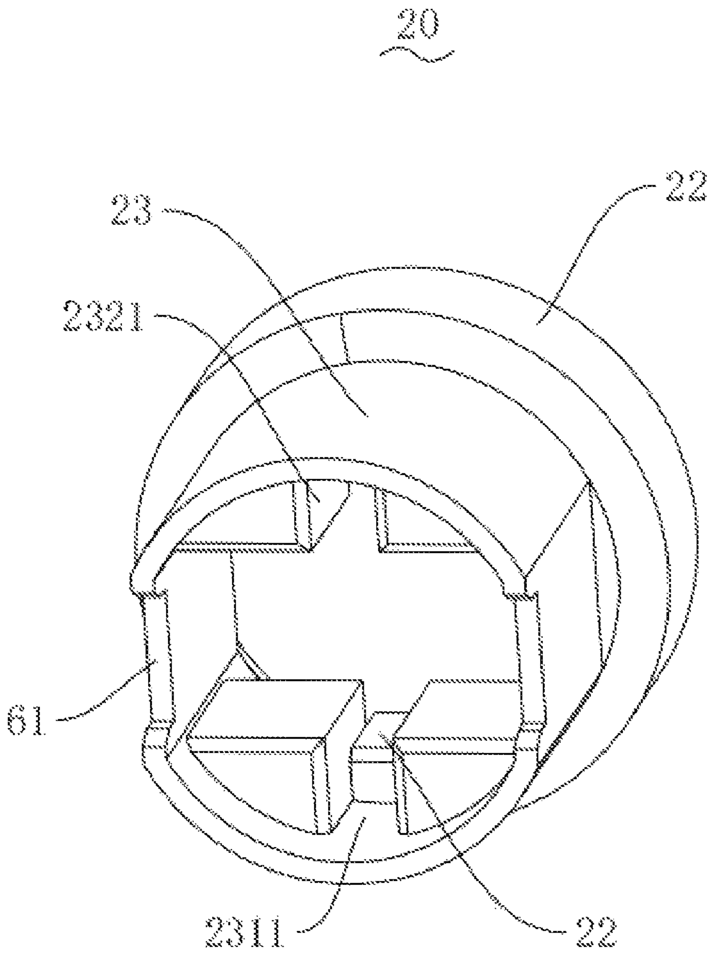
FIG. 10 is another schematic three-dimensional structure diagram of the lamp holder according to an embodiment of the invention.
Figure 11:
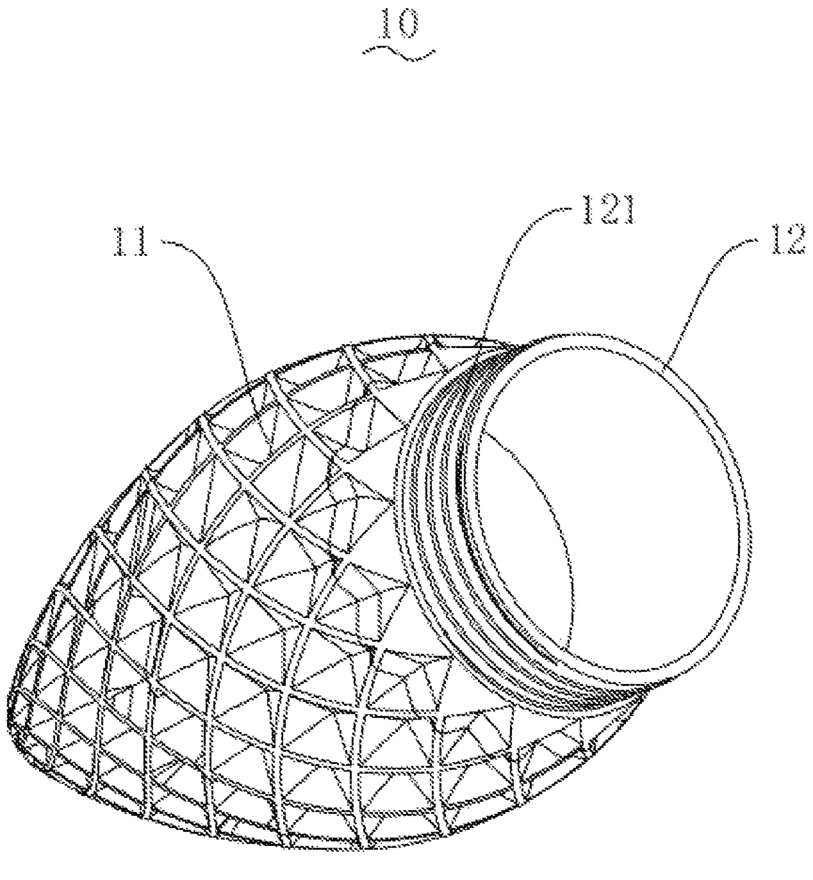
FIG. 11 is a schematic three-dimensional structure diagram of the bulb casing according to an embodiment of the invention.
Figure 12:
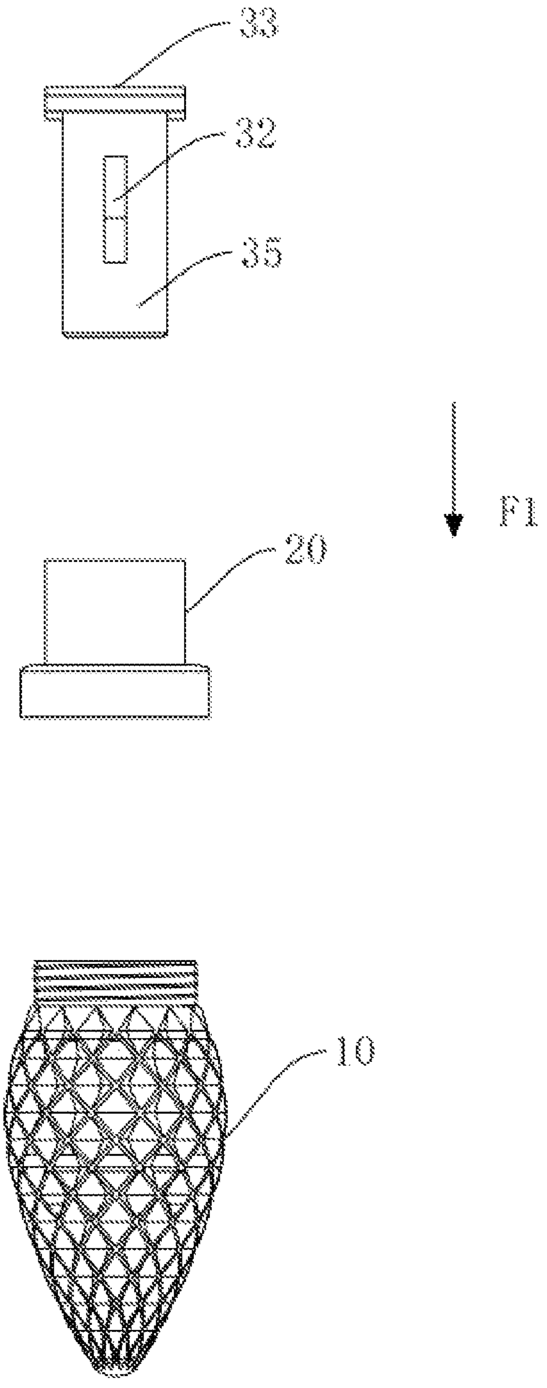
FIG. 12 is another schematic diagram of an exploded decomposition structure of the strawberry lamp holder structure according to an embodiment of the invention.
Figure 13:
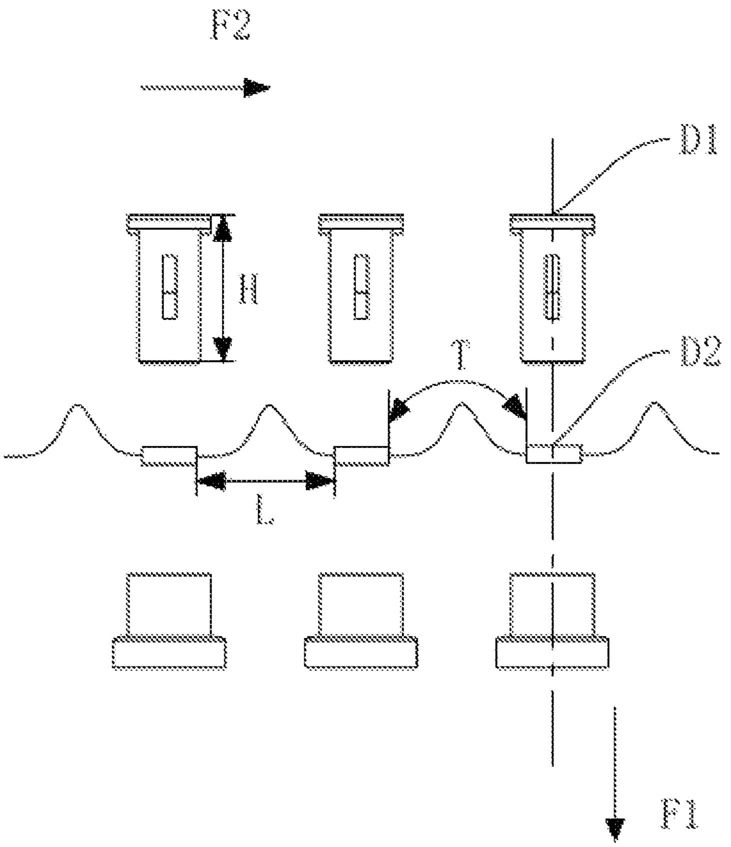
FIG. 13 is a schematic diagram of the principle of the production method according to an embodiment of the invention.
Figure 14:
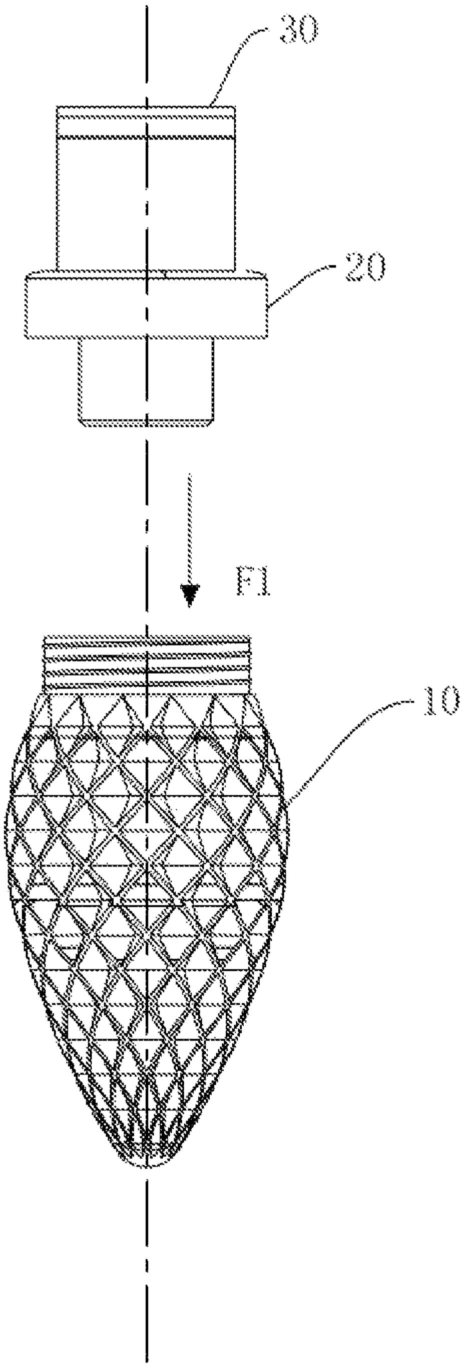
FIG. 14 is another schematic diagram of the principle of the production method according to an embodiment of the invention.

The hanger 34 is integrally formed with the cover plate 33, and the hanger 34 is used to hang the light string. In the embodiment, the number of the first clamping parts 31 is two. As shown in FIG. 3, two first clamping parts 31 are symmetrically arranged on both sides of the cover plate 33, and the hanger 34 is arranged between the two first clamping parts 31, so that when the manipulator grasps the lamp holder cover 30 through the first clamping parts 31, the hanger 34 can be avoided.

The second clamping parts 21 are formed on the upper casing 23, the second clamping parts 21 extend inwardly from the outer peripheral edge of the upper casing 23 to form a plane, and the second clamping parts 21 are symmetrically arranged on both sides of the upper casing 23; during automated production, the manipulator grasps the lamp holder 20 by gripping the second clamping parts 21 on both sides of the upper casing 23. In the embodiment, the plane formed by the first clamping part 31 is coplanar with the plane formed by the second clamping part 21, so as to facilitate positioning when the lamp holder 20 and the lamp holder cover 30 are inserted.

In one embodiment, the lamp holder 20 further comprises: a lower casing 24. The bulb casing 10 comprises: a strawberry casing 11 and a threaded connection part 12.

The strawberry refers to the strawberry shape as shown in FIGS. 1-15. The lower casing 24 is integrally formed with the upper casing 23; the lower casing 24 is formed with an internal thread 25, and the lower casing 24 is in threaded connection with the bulb casing 10 through the internal thread 25. The threaded connection part 12 is integrally formed at the end of the strawberry casing part 11 close to the lamp holder 20, and the threaded connection part 12 is formed with an external thread 121; the external thread 121 is matched with the internal thread 25 of the lower casing 24 to connect the lower casing 24 and the bulb casing 10. The bulb casing 10 and the lamp holder 20 are respectively made of plastic injection molding. Since the plastic has a certain elasticity, during the automated production process, the lower casing 24 can be directly squeezed into the bulb casing 10 by pressing to improve production efficiency.

In one embodiment, in order to facilitate automated production, the lamp holder cover 30 further comprises: a first supporting plate 35, a second supporting plate 36, and an installation part 37.

The first supporting plate 35 is formed by extending from the cover plate 33 toward the direction close to the lamp holder 30; the second supporting plate 36 is arranged opposite to the first supporting plate 35, and a second gap 62 is formed between the first supporting plate 35 and the second supporting plate 36; the first gap 61 is communicated with the second gap 62. During the automated production process, the redundant wires 50 can be accommodated in the second gap 62, thereby reducing the precision requirement on the length of the wire 50 between the two lamp beads 40 during the production process, and improving the fault tolerance rate.

The installation part 37 integrally formed between the first supporting plate 35 and the second supporting plate 36; the lamp bead 40 is provided on the side of the installation part 37 close to the lamp holder 20; when the lamp holder cover 30 is inserted into the lamp holder 20, the space on the side of the installation part 37 close to the lamp holder 20 is kept in communication with the second gap 62; the wire 50 extends out of the strawberry lamp holder structure 100 through the second gap 62 and the first gap 61. During the automated production process, the lamp holder 20 is inserted into the lamp holder cover 30, and the manipulator grabs the lamp holder cover 30 and moves toward the lamp holder 20; the lamp bead 40 is located between the lamp holder cover 30 and the lamp holder 20, and the lamp bead 40 is pushed into the lamp holder 20 through the installation part 37; the wires 50 at both ends of the lamp bead 40 bypass the installation part 37 and extend to the outside of the lamp holder 20 through the second gap 62 and the first gap 61.

In one embodiment, the upper casing 23 comprises: first guiding parts 231 and second guiding parts 232.

First guiding parts 231 are formed by extending from the upper casing 23; second guiding parts 232 are arranged opposite to the first guiding parts 231; a third gap 63 is formed between the first guiding part 231 and the second guiding part 232; the first supporting plate 35 and the second supporting plate 36 are inserted into the third gap 63 along the first direction F1. The reverse limiting blocks 32 are respectively arranged on the side of the first supporting plate 35 away from the second supporting plate 36, and on the side of the second supporting plate 36 away from the first supporting plate 35. The middle of the first guiding part 231 is recessed outwardly to form a first guiding groove 2311, and the middle of the second guiding part 232 is recessed outwardly to form a second guiding groove 2321; the reverse limiting steps 22 are respectively arranged in the first guiding groove 2311 and the second guiding groove 2321. During the automated production process, when the manipulator grabs either the lamp holder 20 or the lamp holder cover 30 and inserts it into the other, the lamp holder cover 30 slides into the second gap 62 through the first guiding groove 2311 and the second guiding groove 2321, and the reverse limiting blocks 32 squeeze the reverse limiting steps 22 and are abutted reversely therewith, thereby realizing the reverse limiting, avoiding the reverse separation of the lamp holder cover 30 and the lamp holder 20, so as to realize the fixing of the lamp holder 20 and the lamp holder cover 30.

Figure 15:
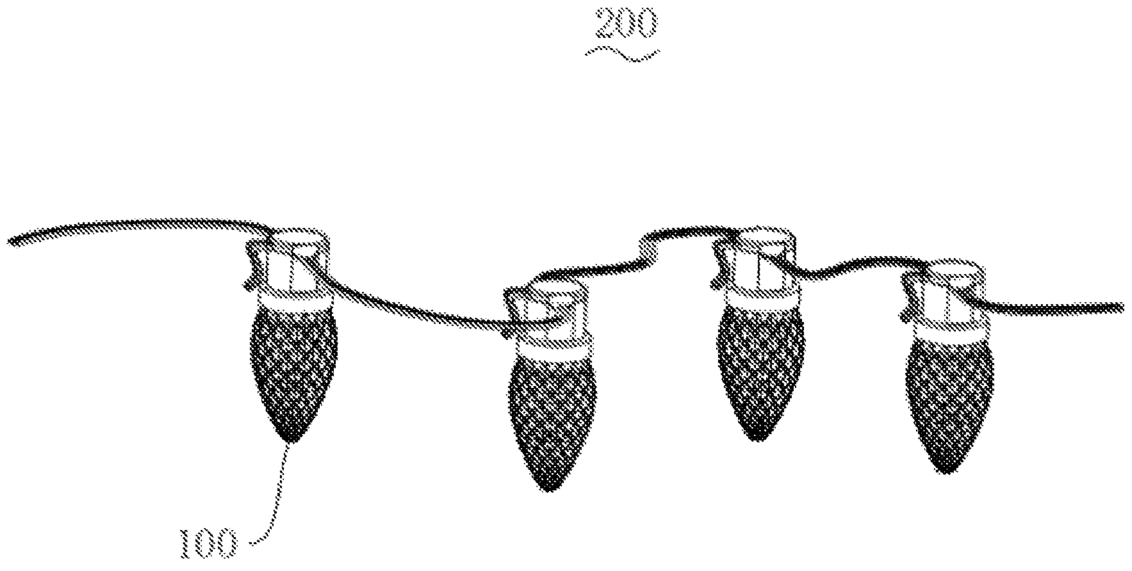
FIG. 15 is a schematic three-dimensional structure diagram of the strawberry light string according to an embodiment of the invention.

One embodiment of the invention further provides a strawberry light string 200, as shown in FIG. 15, wherein the strawberry light string 200 comprises the strawberry lamp holder structure 100 that can be automatically produced.

One embodiment of the invention further provides an automated production method for the strawberry light string 200, for producing the strawberry light string 200, wherein the method comprising the steps of:

step S10: fixing the lamp holder cover 30 at a first position D1 by the first clamping parts 31;

step S20: fixing the lamp holder 20 at a second position D2 by the second clamping parts 21, and the first position D1 and the second position D2 are collinear in the first direction;

step S30: arranging the wires 50 connected with the lamp bead 40 in series between the lamp holder cover 30 and the lamp holder 20 along the second direction F2, and each of the lamp beads 40 is collinear with each of the lamp holders 20 and each of the lamp holder covers 30 in the first direction F1.

In order to prevent the wire 50 between the two lamp beads 40 from being too short, causing the lamp bead 40 to be pressed into the lamp holder 20 and then tearing the wire 50 between the two lamp beads 40, the length of the wire 50 between the two lamp beads 40 needs to be adjusted reasonably. The distance between two adjacent lamp beads 40 is denoted as L, the length of the wire 50 between two adjacent lamp beads 40 is denoted as T, and the height of the lamp holder cover 30 is denoted as H, which satisfy the relational expression:

$$L+2H<T.$$

Therefore, it prevents the wire 50 between the two lamp beads 40 from being too short, causing the lamp bead 40 to be pressed into the lamp holder 20 and then tearing the wire 50 between the two lamp beads 40. The excess length of the wire 50 can be accommodated in the second gap 62, which reduces the requirement on production precision and improves the efficiency.

step S40: pushing the lamp holder cover 30 to be inserted into the lamp holder 20 along the first direction F1, and in the process of inserting, the lamp holder cover 30 first contacts with the lamp bead 40, and drives the lamp bead 40 to be squeezed into the lamp holder 20 along the first direction F1; the wire 50 extends to the outside of the lamp holder 20 through the first gap 61.

step S50: connecting the bulb casing 10 to the lamp holder 20.

Thereby, the invention decomposes the traditional assembly of lamp holder 20 and lamp bead 40 into the assembly of lamp holder 20, lamp holder cover 30 and lamp bead 40, and first clamping parts 31 and second clamping parts 21 are respectively provided on the lamp holder cover 30 and the lamp holder 20, so as to facilitate grasping or fixing by the manipulator; the lamp bead 40 is provided between the lamp holder cover 30 and the lamp holder 20, and a first gap 61 is formed between the first clamping part 31 of the lamp holder cover 30 and the second clamping part 21 of the lamp holder 20, so as to facilitate the passage of welded wires 50, therefore, the lamp holder cover 30 and the lamp holder 20 can be inserted directly, and the assembly of the lamp holder 20, the lamp holder cover 30 and the lamp bead 40 can be completed at the same time, so that the installation action is simpler and the automatic production is more convenient.

The above embodiments only represent several embodiments of the invention, and the descriptions thereof are specific and detailed, but should not be construed as a limitation on the scope of the patent application. It should be pointed out that for those of ordinary skill in the art, several modifications and improvements can also be made without departing from the concept of the invention, which all belong to the protection scope of the invention. Therefore, the protection scope of the patent of the invention should be subject to the appended claims.

What is claimed is:

1. A strawberry lamp holder structure that can be automatically produced, wherein the strawberry lamp holder structure comprises:

a bulb casing;

a lamp holder, which is connected to the bulb casing;

a lamp holder cover, which is inserted into the lamp holder; the direction in which the lamp holder cover is inserted into the lamp holder is denoted as a first direction, and the direction perpendicular to the first direction is denoted as a second direction; viewed from the second direction, the lamp holder cover is recessed inwardly to form first clamping parts, and the lamp holder is recessed inwardly to form second clamping parts located on the same side as the first clamping parts; a first gap is formed between the first clamping part and the second clamping part;

a lamp bead, with wires in series at both ends; the lamp bead is provided between the lamp holder and the lamp holder cover, and the wire extends out of the strawberry lamp holder structure through the first gap;

wherein the direction perpendicular to the first direction and the second direction is denoted as a third direction;

viewed from the second direction, the lamp holder cover extends outwardly along the third direction to form reverse limiting blocks, and the lamp holder extends inwardly along the third direction to form reverse limiting steps matched with the reverse limiting blocks; when the lamp holder cover is inserted into the lamp holder along the first direction, the reverse limiting blocks and the reverse limiting steps are abutted along the first direction;

wherein: the lamp holder cover comprises:

a cover plate; the first clamping parts are symmetrically arranged on both sides of the cover plate, and the first clamping parts extend inwardly from the outer peripheral edge of the cover plate to form a plane;

a hanger, which is integrally formed with the cover plate;

the lamp holder comprises:

an upper casing; the second clamping parts are symmetrically arranged on the upper casing, and the second clamping parts extend inwardly from the outer peripheral edge of the upper casing to form a plane, and the plane formed by the first clamping part is coplanar with the plane formed by the second clamping part;

wherein the lamp holder cover further comprises:

a first supporting plate, which is formed by extending from the cover plate toward the direction close to the lamp holder;

a second supporting plate, which is arranged opposite to the first supporting plate, and a second gap is formed between the first supporting plate and the second supporting plate; the first gap is communicated with the second gap;

an installation part, which is integrally formed between the first supporting plate and the second supporting plate; the lamp bead is provided on the side of the installation part close to the lamp holder; when the lamp holder cover is inserted into the lamp holder, the space on the side of the installation part close to the lamp holder is kept in communication with the second gap; the wire extends out of the strawberry lamp holder structure through the second gap and the first gap.

2. The strawberry lamp holder structure that can be automatically produced of claim 1, wherein:

the lamp holder further comprises:

a lower casing, which is integrally formed with the upper casing; the lower casing is formed with an internal thread, and the lower casing is in threaded connection with the bulb casing through the internal thread;

the bulb casing comprise:

a strawberry casing;

a threaded connection part, which is integrally formed at the end of the strawberry casing part close to the lamp holder, and the threaded connection part is formed with an external thread; the external thread is matched with the internal thread of the lower casing to connect the lower casing and the bulb casing.

3. The strawberry lamp holder structure that can be automatically produced of claim 1, wherein:

the reverse limiting blocks are respectively arranged on the side of the first supporting plate away from the second supporting plate, and on the side of the second supporting plate away from the first supporting plate;

the upper casing comprises:

first guiding parts, which are formed by extending from the upper casing;

second guiding parts, which are arranged opposite to the first guiding parts; a third gap is formed between the first guiding part and the second guiding part; the first supporting plate and the second supporting plate are inserted into the third gap along the first direction.

4. The strawberry lamp holder structure that can be automatically produced of claim 3, wherein:

the middle of the first guiding part is recessed outwardly to form a first guiding groove, and the middle of the second guiding part is recessed outwardly to form a second guiding groove; the reverse limiting steps are respectively arranged in the first guiding groove and the second guiding groove.

* * * * *